United States Patent [19]

Padovani

[11] 4,409,173
[45] Oct. 11, 1983

[54] PROCESS AND APPARATUS FOR THE MANUFACTURE OF OBJECTS OF CRYSTALLINE POLYSTYRENE

[75] Inventor: Pietro Padovani, Verona, Italy
[73] Assignee: O.M.V. SpA, Italy
[21] Appl. No.: 319,242
[22] Filed: Nov. 9, 1981

[30] Foreign Application Priority Data
Nov. 17, 1980 [IT] Italy ............... 84970 A/80

[51] Int. Cl.³ ............................................. D01D 5/12
[52] U.S. Cl. ........................ 264/210.2; 264/210.1; 264/294; 425/143; 425/325; 425/376 R
[58] Field of Search ............ 264/40.6, 210.1, 210.2, 264/294; 425/143, 325, 327, 376, DIG. 201

[56] References Cited

U.S. PATENT DOCUMENTS

| | | | |
|---|---|---|---|
| 3,161,915 | 12/1964 | Thiel | 425/DIG. 201 |
| 3,931,383 | 1/1976 | Erlewine et al. | 264/210.1 |
| 4,083,914 | 4/1978 | Schippers et al. | 264/210.2 |
| 4,086,045 | 4/1978 | Thiel et al. | 425/327 |
| 4,105,386 | 8/1978 | Thiel et al. | 425/327 |
| 4,118,454 | 10/1978 | Miki et al. | 264/294 |

FOREIGN PATENT DOCUMENTS
1038174  8/1966  United Kingdom .

*Primary Examiner*—Donald E. Czaja
*Assistant Examiner*—W. Thompson
*Attorney, Agent, or Firm*—Marvin E. Jacobs

[57] ABSTRACT

Crystalline polystyrene is thermoformed by extruding molten material into a temperature controlled roller press having press rollers and draw rollers separated by a support roller. The buildup of sheet between the support and draw roller is controlled. The edges of the sheet are heated and then gripped by a first set of sprockets and a second set positioned past the thermoforming device. The gripped sheet passes through a heating device where both sides of the sheet are heated before the intermittent action of the press. The formed objects are removed and the second sprockets feed the sheet to a grinder.

11 Claims, 7 Drawing Figures

PROCESS AND APPARATUS FOR THE MANUFACTURE OF OBJECTS OF CRYSTALLINE POLYSTYRENE

The present invention relates to improvements made to the process and apparatus used in the manufacture of cups, containers and similar packagings which are obtained by the hot forming of a sheet of polystyrene of the so-called "crystalline" type.

Crystalline polystyrene is a synthetic material having special characteristics which prevent it from being used in the processes and apparatus traditionally used for many synthetic materials such as for example polyvinyl, polyethylene, polypropylene, high impact polystyrene and the like. In a known process, crystalline polystyrene in sheet form is transferred from the die outlet to the unit in which the objects are formed, the sheet being kept at the forming temperature during transit and as far as possible avoiding subjecting the sheet to longitudinal stretching and at the same time avoiding the use of means of traction which act to grip the edges of the sheet.

In a known embodiment, the polystyrene sheet is supported between the outlet of the die and the forming unit by means of at least a pair of suitably heated rollers, wherein the roller located adjacent to the die outlet is kept in continuous rotation while the roller immediately upstream of the forming unit has rotational movement imparted thereto only when the forming unit needs to be supplied with a portion of a sheet in conjunction with the action of a pair of draw rollers located downstream of the forming unit itself.

As the sheet is produced continuously, while forming of the objects is intermittent, the amount of sheet which is fed out in each waiting period builds up in the region between the rollers supporting the sheet.

As a consequence thereof, the portion of the sheet which is supported by the roller located immediately upstream of the forming unit has a different temperature than the portion of the sheet which is supported by the roller located adjacent to the build-up zone. It is also clear that as the sheet is not stabilized with respect to either the weight of the sheet in the build-up zone or the tension exerted by the roller when it feeds the sheet into the forming unit, the sheet is subjected to undesirable extension with consequent variations in thickness.

Also in accordance with the known embodiment briefly described above, the sheet fed to the forming unit reaches it under temperature conditions and in a position which are certainly not ideal for good forming in view of the fact that the sheet issuing from the die outlet is subsequently heated by the supporting rollers on only one side and that it is passed to the forming unit when it is supported only by the roller immediately upstream of the forming unit and the drawing device located downstream of that unit.

Objects which are obtained from sheets of crystalline polystyrene produced and fed to the forming unit in the manner described above are not satisfactory for a number of reasons. Despite the fact that these objects are manufactured from a single transverse strip of the sheet and are identical in shape and external dimensions, they are of different weight, show differences in thickness and transparency between one part of a given object and another, and are quite fragile. With the object of avoiding the above disadvantages the invention proposes that sheets of crystalline polystyrene should be manufactured and suitably rolled with a degree of stabilisation which makes it possible to draw the sheet upstream of the forming unit in such a way that the said unit is fed with portions of sheet under optimum conditions of thickness, heating and positioning.

According to the present invention there is provided a process for the manufacture of objects, such as cups, containers or other packaging, of crystalline polystyrene comprising the continuous extrusion of a sheet of crystalline polystyrene through a die having an outlet with an adjustable profile, rolling and stabilisation of the said sheet, heating the edges thereof, drawing it by means of lateral guides to a heating device and a subsequent forming device, removing the objects so obtained from the press component of the forming device and grinding up the waste.

Also according to the present invention there is provided an apparatus for the manufacture of such objects comprising a screw extruder having a die with an outlet of adjustable profile, mounted at the end of the screw of the extruder, a roller press having a plurality of temperature-adjustable rollers and at least one pair of draw rollers to draw the sheet, at least one of said draw rollers being temperature-adjustable, at least one sheet supporting roller which is free to rotate about its own axis and is of low thermal conductivity at least on its surface, two switches controlling the build-up of the sheet in the region between the pair of draw rollers and the sheet supporting rollers which can be activated by detection of the position of the sheet by means of mechanical sensors or photocells, a device for heating both edges of the sheet which can be positioned in relation to the breadth of the sheet and adjusted for temperature in relation to the thickness and the distance moved by the advancing sheet, at least one drawing device having chains and sprockets acting on the edges of the sheet, at least one device for heating both sides of the sheet in relation to the part which is to be thermoformed, a forming device having a press component, a device for removing objects from the press component, a device for stacking the objects and a device for grinding up the waste.

The object of the invention is achieved by using a roller press downstream of the outlet of a die, the press consisting of at least three temperature-adjustable rollers, and at least one pair of rollers to draw the sheet from the roller press, at least one of these being adjustable for temperature, at least one roller supporting the sheet which is free to rotate on its own axis, a device for heating the edges of the sheet, a drawing device which acts on the heated edges of the sheet from a heating device which acts on both sides of the sheet, a device for forming the objects, a device for ejecting the products from the part of the press holding them, a device for stacking the same and a device for grinding up the waste.

The temperature of the roller press rollers, their speed and the distance between them are adjusted so that the portion of sheet between the last roller and the pair of draw rollers which withdraw it from the roller press is sufficiently stabilised by the latter so that the sheet maintains its thickness unchanged even when affected by the drawing action of the draw rollers which draw it from the roller press.

The device for heating the edges of the sheet, which can be positioned in accordance with the breadth of the sheet and adjusted for the thickness of the sheet and the distance which it advances in each step, makes it possible for the edges to be engaged by the drawing device without cracking or splitting.

The drawing device which acts on the edges of the sheet, and which is located upstream of the forming unit, keeps the sheet at a constant distance from the heating panels and the plates of the forming device.

The present invention will be further illustrated, by way of example, with reference to the accompanying drawings, in which.

Figure 1:
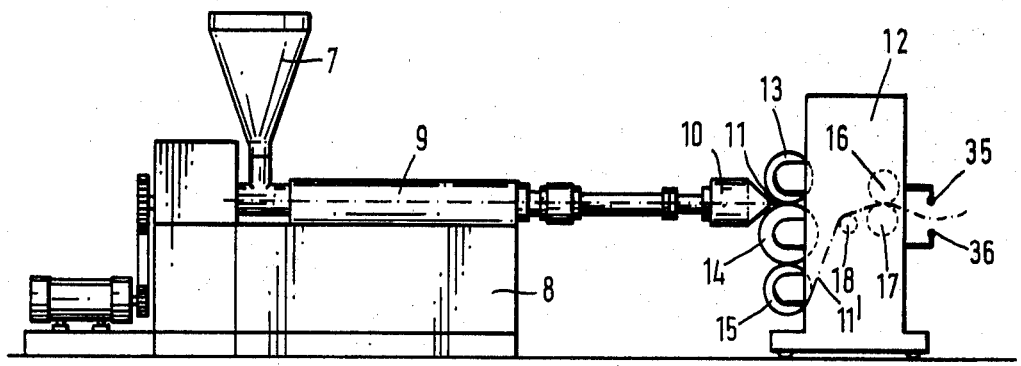
FIGS. 1 and 2 are diagrammatic side views of two sections of an apparatus of the type for carrying out the process according to the invention.
Figure 2:
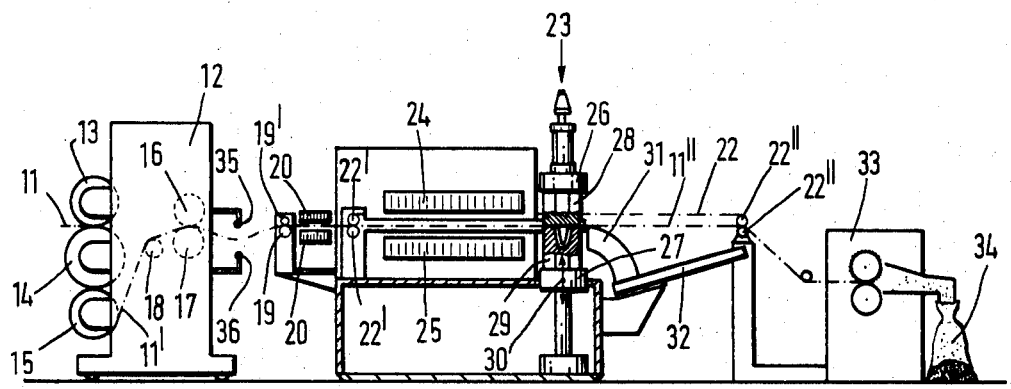

As illustrated in FIGS. 1 and 2, the apparatus is fed with crystalline polystyrene in granular form by means of a loading hopper 7 mounted on an extruder 8, the screw of which 9 is provided with a die 10 with an outlet having an adjustable profile for the continuous production of a sheet 11 of crystalline polystyrene of given breadth and thickness at a variable speed.

Downstream of die 10, the sheet 11 passes through a roller press 12 having temperature-adjustable rollers 13, 14, 15, which are continuously in motion at an adjustable speed and are located suitable distances apart so that the portion 11' of the sheet which lies between roller 15 and the pair of draw rollers 16, 17, which draw the sheet from the roller press 12 has a constant thickness, is markedly oriented in a longitudinal direction and is sufficiently stabilised for its thickness to remain the same despite the pulling action of the pair of draw rollers 16, 17, at a temperature such as to avoid the cracking which would be caused by draw rollers 16, 17, if stabilisation were extended to a very low temperature.

One or more additional rollers 18, each capable of rotating about its own axis and being temperature-adjustable, are used to bring part 11' of the sheet close to the pair of draw rollers 16, 17, in a direction which is at right angles or substantially at right angles to the plane containing the axes of rotation of draw rollers 16 and 17, the latter of which is temperature-adjustable, as can be seen in FIGS. 1 and 2.

Sheet 11', which leaves roller press 12, continuously builds up in the zone between the pair of draw rollers 16, 17, and the sheet supporting roller 19 which is free to rotate about its own axis and is made of a low thermal conductivity material at least on the surface of the roller. A second roller 19', similar to roller 19, is provided to prevent the sheet 11' from coming into contact with radiant panels 20.

Figure 3:
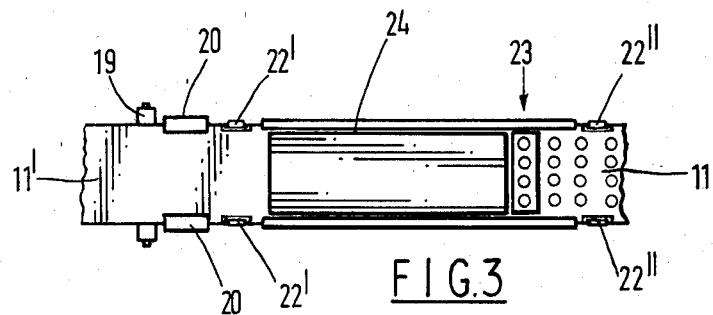
FIG. 3 is a partial view from above of the section illustrated in FIG. 2.
Figure 4:
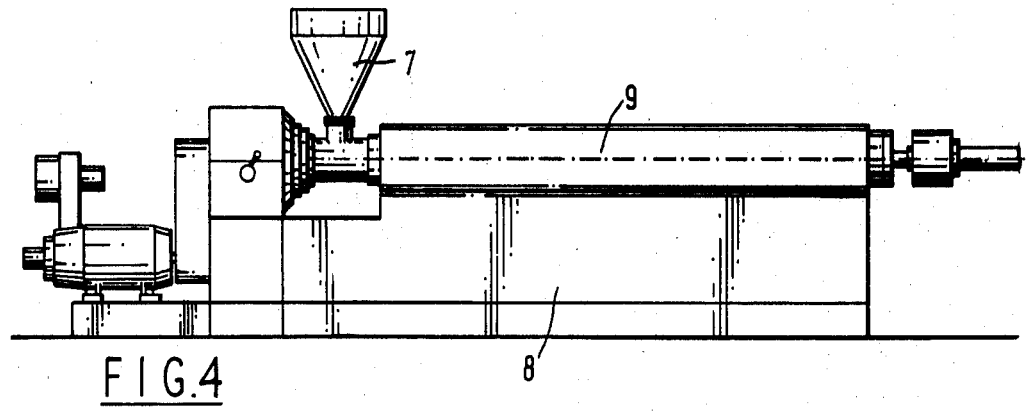
FIGS. 4, 5 and 6 are diagrammatic side views of three sections of a second apparatus for carrying out the invention which differs from the first in the roller press, the forming device and the device for ejection of the objects.

Downstream of roller 19, as illustrated in FIGS. 2 and 3, the edges of the sheet 11' are heated by a pair of small radiant panels 20 which can be positioned in relation to the health of the sheet and adjusted according to its thickness and the distance through which it advances. The sheet is advanced by means of an intermittent drawing device 22 utilising a draw sprocket 22' and return sprocket 22", or by similar means, which act on the edges of the sheet.

Sheet 11' is caught up by the drawing device 22 upstream of the forming unit 23 without any damage to the crystalline polystyrene sheet because its edges have been heated.

The drawing device 22 accompanies the sheet through a radiant panel heating device 24 and 25, holding the sheet at a constant distance from the said panels so that the sheet is optimally heated on both sides.

The drawing device 22 causes the sheet to advance parallel to the upper 26 and lower 27 plates of the forming unit 23 so that the sheet comes between the two parts of the press 28 and 29 in an optimum position for uniform distribution of the material while the objects are being formed.

The objects are formed as the result of the alternating movements of plate 27, shown diagrammatically at 30 and controlled by a cam device which is not illustrated and is itself known.

Once the objects have been formed, press component 29 follows the downward movement of plate 27 while the bases of the cavities used in molding the objects remain fixed. The objects, supported on these bases, are struck by jets of air which cause them to enter the circular guides 31 which deposit them on a set of inclined planes 32 adjacent to each other where they are stacked in rows parallel to each other by means of small pistons.

The waste 11" which consists of the perforated sheet, clearly visible in FIG. 3 downstream of the forming unit 23, is passed to a grinder 33, which is itself known, where it is ground up and the particles are collected in bags 34.

It should be noted that the build-up of sheet 11', in the zone between the pair of rollers 16, 17, and the supporting roller 19 and in an amount necessary for the regular functioning of the machine, is controlled by two switches, a minimum switch 35 and a maximum switch 36. Detection of minimum or maximum build-up is by means of mechanical devices or photocells which are themselves known and act on switches 35 or 36 so as to decrease or increase respectively the rate of production of the thermoformed objects and at the same time maintain the final characteristics of the objects themselves unchanged. The switches 35 and 36 can be designed to slow down or speed up the production of rolled and stabilised crystalline polystyrene sheet instead of speeding up or slowing down the rate of output of objects without varying the characteristics of sheet production.

The provision on the apparatus of a minimum switch to control the rate of output of objects and of a maximum switch to control the rate of production of sheet must be regarded as being within the scope of one skilled in the art and therefore within the scope of the invention.

With reference to FIGS. 4 to 7, which illustrate a variation of the apparatus described above, it will be noted that the roller press 12 is in two parts 12' and 12" (see FIG. 5) between which a device for measuring and controlling the thickness of the sheet 11' can be located, this device not being illustrated but being of known type.

Figure 5:
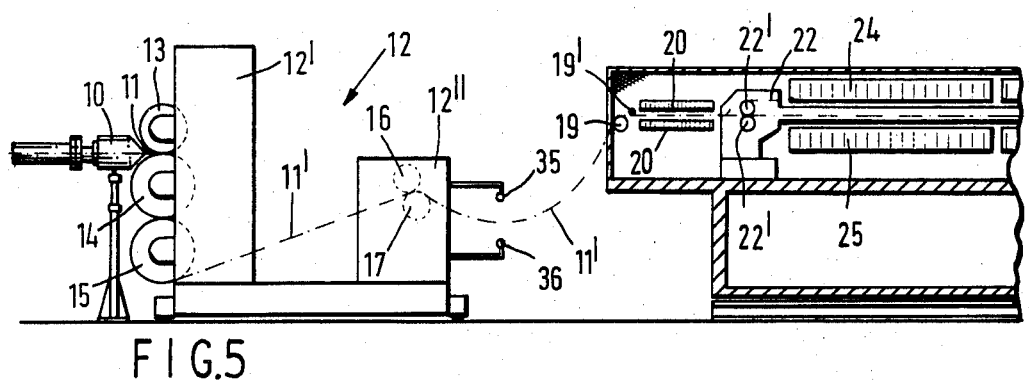

In FIG. 5, the direction of the sheet 11', lying between roller 15 and the pair of rollers 16 and 17, is at right angles to the plane containing the axes of rotation of the pair of rollers 16 and 17.

The pull exerted by the rollers 16 and 17 in FIG. 5 does not have to be in the same plane as that exerted by sprockets 22' and it is clear that rollers 16, 17, may be located above the plane of sprockets 22' instead of beneath without going beyond the scope of the invention.

A sheet restraining roller 19' is provided downstream of roller 19, before the radiant panels 20 and above the sheet 11', to prevent the sheet from coming into contact with the panels 20.

Figure 6:
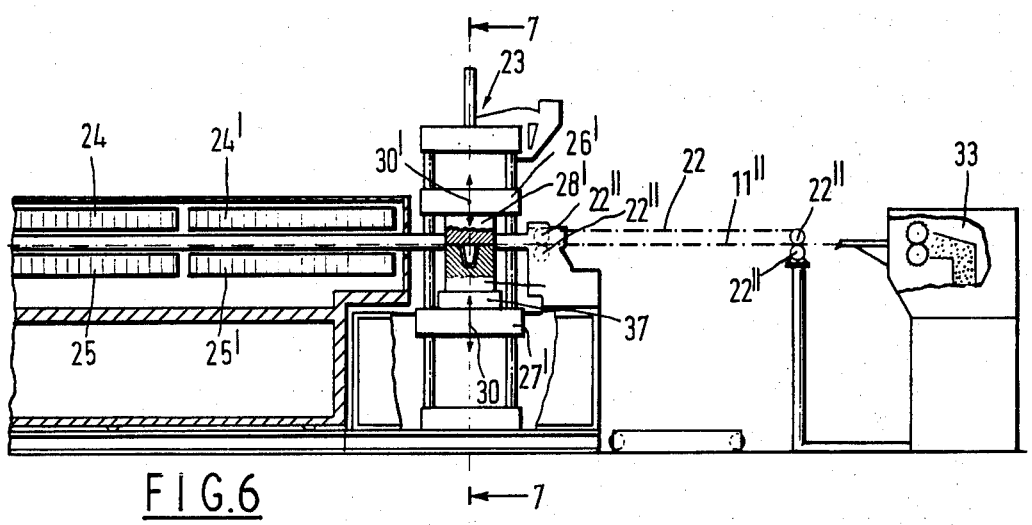

In this second type of apparatus, a second set of radiant panels 24', 25', is provided in addition to radiant panels 24, 25, in order to improve the progressive heating of sheet 11 and in view of the fact that the forming unit 23, unlike the one illustrated, may be used to form several rows of objects parallel to each other across the sheet. With reference to FIG. 6 it will be noted that both the plates 26' and 27' are provided with alternating motion as shown diagrammatically for each of these at 30 and 30'.

Figure 7:
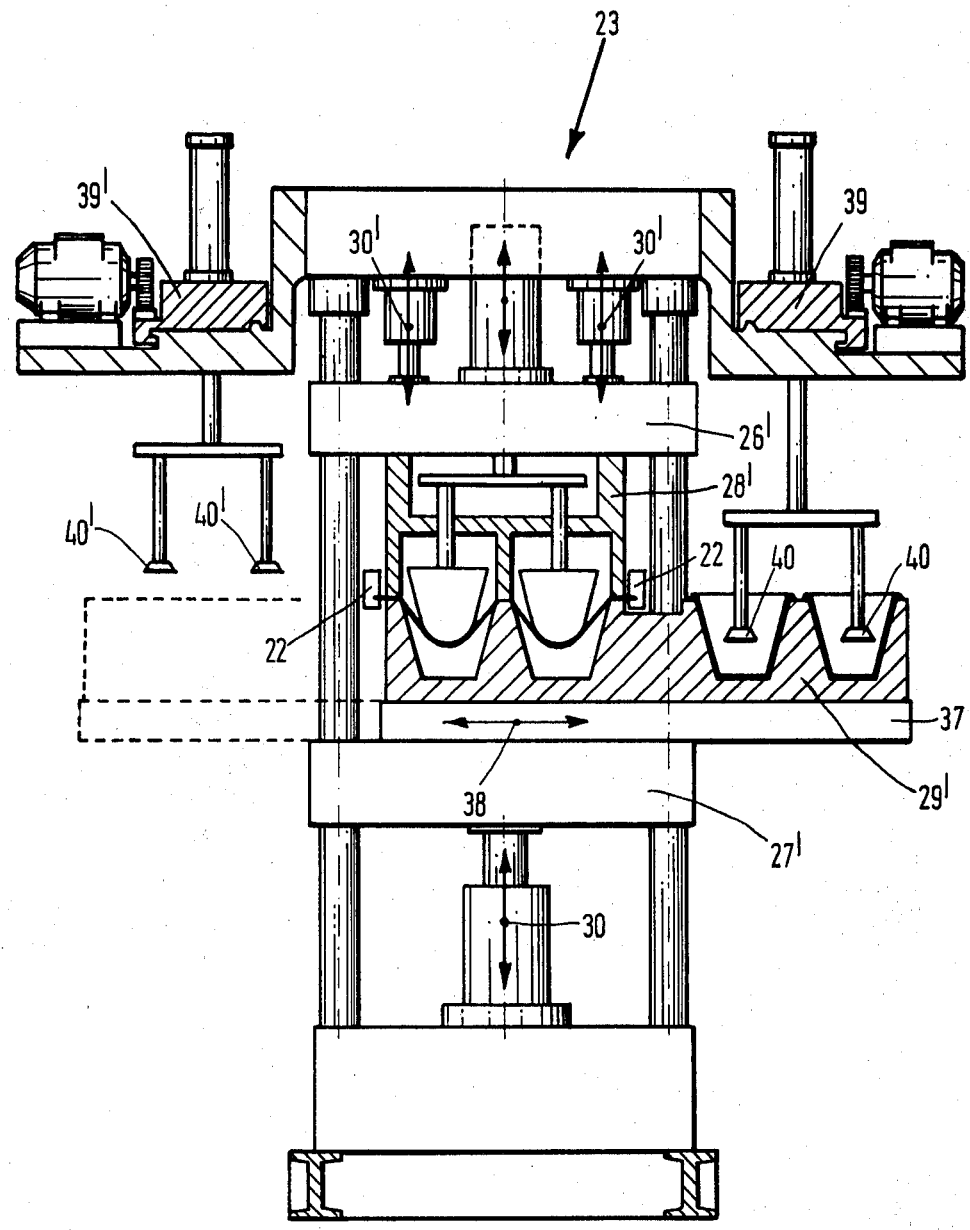
FIG. 7 is a diagrammatic cross-section of the forming device taken along the line 7—7 of FIG. 6.

While press component 28' is linked with the movement of plate 26', press component 29', which is supported by a ram 37 which can move over plate 27' in alternating movements shown diagrammatically at 38 in FIG. 7, is linked to the motion of both plate 27' and ram 37.

Unlike the one illustrated in FIGS. 2 and 3, the forming unit shown at 23 in FIGS. 6 and 7 will allow a high rate of output because press component 29', which supports the thermoformed objects, is doubled with respect to component 28' and can be used to remove the objects from the press, for example by means of an unloading device 39 with a sucker 40 while a new set of objects is being formed in forming unit 23, these in turn being unloaded from the forming unit by a second sucker unloading unit 39', 40'.

Although not illustrated in the drawings, the process according to the invention can also be implemented using rotary thermoforming devices in which the sheet feed is continuous instead of intermittent.

It should also be understood that the description has been given by way of a non-restrictive example and that the scope of the invention includes the substitution of devices or parts thereof by other equivalent devices.

I claim:

1. A process for the manufacture of objects, such as cups, containers or other packaging, of crystalline polystyrene comprising the steps of:
   heating particulate crystalline polystyrene to form molten material,
   continuously extruding said molten crystalline polystyrene through a die having an outlet with an adjustable profile to form a sheet,
   rolling and stabilizing said sheet,
   heating both edges of the sheet,
   drawing the sheet by applying lateral guides to the heated edges,
   passing the drawn sheet through a heating device to heat both surfaces and through a subsequent forming device to form said objects,
   removing the objects so obtained from the press component of the forming device and
   grinding up the waste.

2. Apparatus for the manufacture of objects such as cups, containers or other packaging of crystalline polystyrene comprising:
   a screw extruder having a die with an outlet of adjustable profile mounted at the end of the screw of the extruder to produce a continuous sheet of molten, crystalline polystyrene,
   a roller press having a plurality of temperature-adjustable fixed, forming rollers and at least one pair of draw rollers to draw the sheet, at least one of said draw rollers being temperature-adjustable,
   at least one sheet supporting roller which is free to rotate about its own axis and is of low thermal conductivity at least on its own surface positioned between the forming rollers and the draw rollers,
   means for controlling the build-up of the sheet in the region between the pair of draw rollers and the sheet supporting roller,
   a device for heating both edges of the sheet,
   at least one drawing device having chains and sprockets acting on the heated edges of the sheet,
   at least one device for heating both sides of the sheet in the area which is to be thermoformed,
   a forming device having a press component for forming objects from the heated sheet,
   a device for removing said objects from the press component,
   a device for stacking the removed objects and
   a device for grinding up the sheet portion remaining after forming into waste.

3. A method as recited in claim 1, in which the rate at which the sheet is fed from the die, the speed, the temperature and the distance between the temperature-adjustable rollers and the drawing action of the pair of draw rollers are adjusted in such a way that the sheet is of uniform thickness and is sufficiently stabilised in the section between the last of the temperature-adjustable rollers over which the sheet is fed and the pair of draw rollers.

4. An apparatus as recited in claim 2, in which the plane containing the axes of rotation of the pair of draw rollers is at right angles to the direction in which the sheet arrives at the said pair of draw rollers.

5. An apparatus as recited in claim 2, in which the forming device has a plate supporting the press component which is controlled in its alternating movement by a cam device.

6. An apparatus as recited in claim 2 in which the forming device has press components which are caused to follow the alternating motion of the corresponding plates and one of the press components is subject to the alternating motion of a cam.

7. An apparatus as recited in claim 2, in which the minimum and the maximum build-up switches are capable respectively of slowing down and speeding up the rate of output of thermoformed objects without altering their final characteristics.

8. An apparatus as recited in claim 2, in which the minimum and the maximum build-up switches are capable respectively of speeding up and slowing down the rate of output of the rolled and stabilized sheet without altering its final characteristics.

9. A method according to claim 1 in which the drawing device has a set of chains positioned at and gripping each side of the sheet, and a first set of sprockets positioned after the edge heater and a second set of sprockets positioned after the forming device.

10. An apparatus according to claim 2 in which the drawing device has a set of chains positioned at and gripping each side of the sheet, and a first set of sprockets positioned after the forming device.

11. An apparatus according to claim 2 in which the control means includes a set of minimum and maximum build-up switches for controlling the speed of the sheet.

* * * * *